Nov. 10, 1942.  T. E. McMAHAN  2,301,307
MEANS FOR ORIENTING TOOLS IN A BORE HOLE
Filed Jan. 14, 1942

Inventor
Thomas Emmett McMahan

By Lyon & Lyon
Attorneys

Patented Nov. 10, 1942

2,301,307

UNITED STATES PATENT OFFICE 2,301,307

MEANS FOR ORIENTING TOOLS IN BORE HOLES

Thomas Emmett McMahan, Long Beach, Calif., assignor to Richfield Oil Corporation, Los Angeles, Calif., a corporation of Delaware Application January 14, 1942, Serial No. 426,690

2 Claims. (Cl. 255—1.6)

This invention relates to a device for determining the relations of a deflecting tool, bit, core-barrel or the like to a known azimuth in a bore hole.

This invention may be used in conjunction with any of the well known methods of directional survey recording in which case the results obtained by this invention, coupled with the results of such directional survey enable the operator to determine accurately the deviation of the deflecting tool or whipstock, core-barrel, bit or other suitable tool from a known azimuth. In many cases, however, it is unnecessary to determine the deviation of the tool from a fixed or known azimuth and a determination of the amount of deviation of the tool from a vertical plane passing through the axis of the bore hole is sufficient, in which case the results obtained need not be coupled with those of any directional survey.

Though it has heretofore been proposed to derive the data sought by this invention by means of clinometers inserted in the bore hole, such readings have been costly and employ complicated and often fragile equipment, such as acid bottles. In addition, prior devices in this art have required the opening and disassembling of complicated devices and the use of specially designed equipment and specially trained personnel to enable their results to be accurately read or intelligently interpreted.

It is accordingly one object of this invention to provide a device of the type described which is economical, simple, sturdy, and which is easily but positively operated and accurately read by the ordinary operating personnel of a drilling rig.

It is another object of this invention to provide a device of the class described in which the two markings necessary for the desired data are presented upon a common impression block and in the same or substantially the same horizontal plane, in order to facilitate reading.

It is another object of this invention to position the marking elements of the device permanently in the drill string so that the only element which must be removed from the well for reading and returned for successive operations is a simple impression block, suitably mounted, thus avoiding the insertion and removal from the bore hole of complicated costly and delicate clinometers.

It is another object of this invention to provide a method of orienting tools in a bore hole in which the data desired is obtained upon a single marking element which is adapted to be inserted in a compass card and adjusted to give a direct reading of the deviation of the tool from the known direction of the bore hole.

Other objects and advantages appear hereinafter.

In its broadest aspects this invention consists in means for obtaining upon a single marking member two marks or impressions, one supplied by a fixed member and indicating the horizontal position of the tool and the other supplied by a ball free to move under the force of gravity into a marking position indicating the deviation of the tool from a vertical line. With these two marks or impressions upon a common marking member the operator can, upon inspection, determine the deviation of the tool from the previously determined direction of the bore hole and suitable shifting of the deflecting tool, if such is being utilized, may be made to drill the well in any desired direction.

Figure 1:
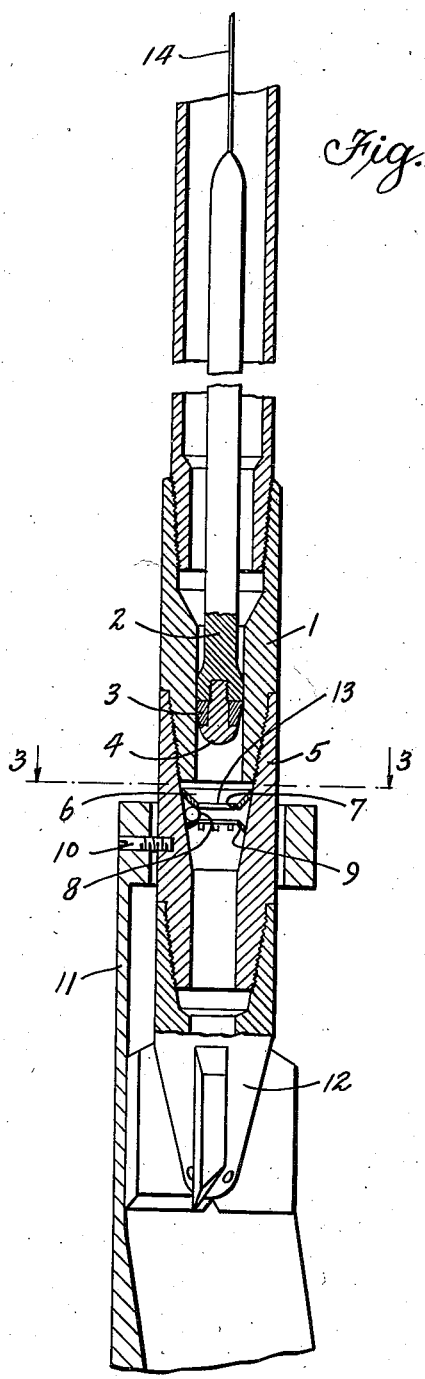
Fig. 1 is a cross sectional elevation showing the invention in place in a well.
Figure 2:
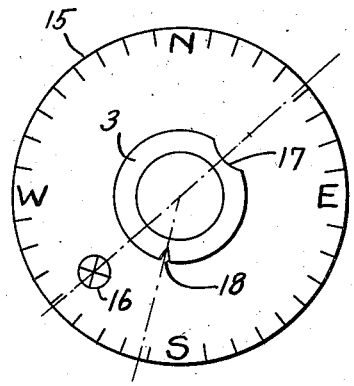
Fig. 2 is a plan view of a compass card employed with my invention with the impression block inserted therein.
Figure 3:
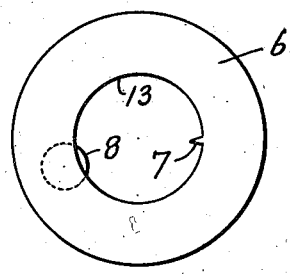
Fig. 3 is a section taken upon the line 3—3 of Fig. 1.

Referring more particularly to the drawing, I have illustrated a length of drill pipe and tool joint 1, connected by a rotary substitute 5 to a bit 12. A deflecting tool or whipstock 11 is removably secured to the rotary substitute 5 by means of a bolt or shear pin 10.

Mounted within the rotary substitute 5 is a striker 6 having a scribe or point 7 projecting into the opening 13 therein. A race 9 is positioned within the rotary substitute 5 and directly below the striker 6. A ball 8 is freely contained in said race 9 and projects a small portion into the opening 13 in the striker 6.

A sinker bar 2 containing a lead or soft metal impression block 3, retained therein by means of retaining member 4, is shown hung in the drill string by means of cable or rods 14.

The operation of the device is as follows: With the tools made up as shown in Figure 1 and with the scribe or point 7 in known fixed position relative to the face of the whipstock 11, the string is lowered to a predetermined position. When the string comes to rest the ball 8, moving under the force of gravity, will run in the race 9 to the low side of the tool, occasioned by the deviation of the bore hole. The sinker bar 2, containing the impression block 3, is then run into the drill pipe and stops upon reaching the striker plate 6. The impression block 3, being tapered, projects into the opening 13 and is simultaneously impressed by the projecting point or scribe 7 and ball 8, leaving marks upon said impression block which lie substantially in the same plane.

The sinker bar and impression block are then removed from the drill string and the impression block 3 may be placed in a compass card 15, having indicated thereon, as at 16, the direction of the bore hole, as previously determined by directional survey. The imprint 17, made by ball 8, is placed 180° from the direction of the bore hole 16 and the notch 18 made by the scribe 7 will immediately indicate in degrees upon the compass card 15 the direction of the tool or whipstock with respect to the bore hole.

In the event that the readings thus obtained indicate an undesirable positioning of the tool, the tool may be shifted, as by rotation of the drill string, and the re-orientation checked by rerunning the sinker bar and impression block for further orientation. In this manner the tool or whipstock can be accurately positioned as desired prior to shearing of the pin 10.

From the foregoing it will be apparent that I have provided novel means and method for orienting production tools and the like in a bore hole which are simple, economical, sturdy and not easily destructible and which also provide for simple and accurate reading of the data secured.

While the particular forms of the invention herein described are well adapted to carry out the objects of the invention, it is to be understood that various modifications and changes may be made without departing from the principles of the invention, and the invention includes all such modifications and changes as come within the scope of the appended claims.

I claim:

1. In a device for orienting tools in a bore hole, the combination of a drill string, a pair of marking elements permanently mounted in said drill string adjacent the tool to be oriented, one of said marking elements having a fixed position relative to said tool, the other of said marking elements being free to roll to the lower side of said drill string, a sinker bar adapted to be lowered into said drill string and carrying an impression element for making contact with said marking elements.

2. In a device for orienting tools in a bore hole, the combination of a drill string, a pair of marking elements permanently mounted in said drill string adjacent the tool to be oriented, one of said marking elements having a fixed position relative to said tool, the other of said marking elements being free to roll to the lower side of said drill string, and an impression element adapted to be lowered into said drill string for contact with said marking elements to secure a record of the position of said marking elements, said record lying in substantially a single horizontal plane.

THOMAS EMMETT McMAHAN.